Aug. 12, 1952      G. R. RATCLIFF      2,606,368
MITER SQUARE
Filed Nov. 8, 1948
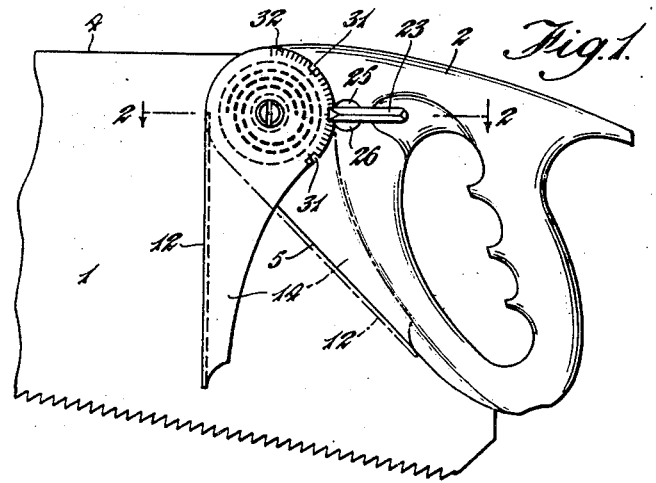
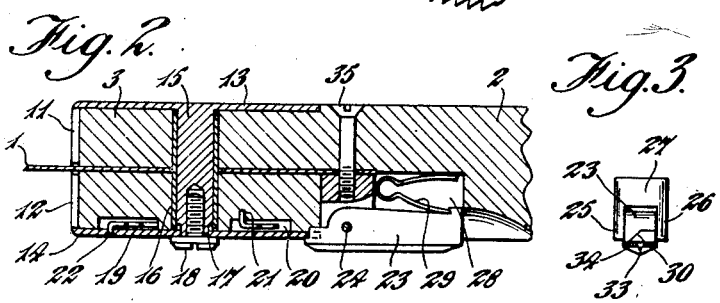
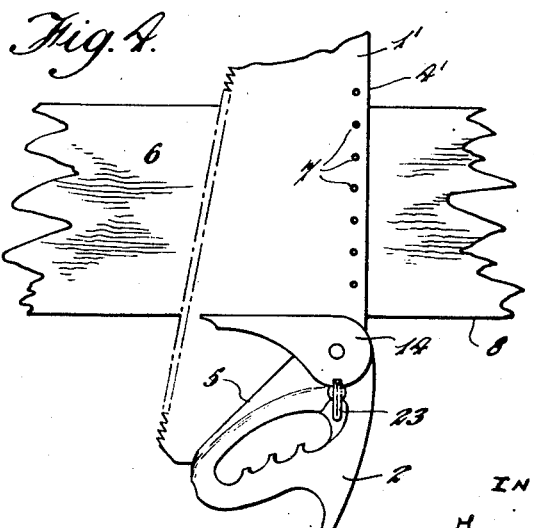
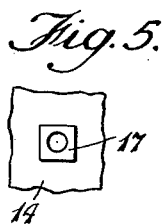
INVENTOR
George R. Ratcliff
By Watson, Cole, Grindle & Watson

UNITED STATES PATENT OFFICE 2,606,368

MITER SQUARE

George Richard Ratcliff, London, England

Application November 8, 1948, Serial No. 58,934
In Great Britain November 10, 1947

2 Claims. (Cl. 33—75)

This invention relates to hand saws of the kind having an attachment comprising a single bevel blade pivoted to the saw, or two bevel blades pivoted to the saw on either side thereof so as to move together, said bevel blade or blades, in conjunction with the back edge or spine of the saw blade, enabling lines to be marked out on a piece of work at any desired angle to an edge of the work.

The primary object of my invention is to provide a hand saw of the kind specified having a generally improved construction as compared with hand saws of this kind heretofore proposed.

A more specific object of my invention is to provide a hand saw of the kind specified in which the bevel attachment, when not required for use, may be moved to a retracted position in which it conforms to the general contour of the handle of the saw and in which the attachment forms a minimum of projecting parts which might interfere with the normal use of the saw or which might be damaged or cause damage to a piece of work.

Another more specific object of my invention is to provide a hand saw of the kind specified in which the bevel attachment has a relatively large pivotal bearing surface and wherein each bevel blade is buttressed or supported whereby the blade has a long working life.

Yet another object of this invention is to provide a hand saw of the kind specified in which the bevel attachment is spring-loaded in its retracted position and is movable under the action of the spring to any desired extended position and in which means are provided for automatically bringing the bevel attachment to rest at any desired positions thereof.

A still further object of my invention is to provide a hand saw of the general kind indicated above which enables a scale readily to be incorporated therewith whereby the bevel blade or blades may quickly be set to any dsired angular position.

Another object of my invention is to provide a hand saw of the kind specified wherein the bevel attachment has greater angular movement than provided by saw attachments heretofore proposed and wherein, as the saw blade, a blade of conventional construction can be used.

Further objects of my invention and the advantages flowing therefrom will be apparent from the following description read in conjunction with the accompanying drawing in which Figure 1 is a partial plan view of one form of saw in accordance with my invention;

Figure 2 is a section taken on line 2—2 of Figure 1, down to an enlarged scale;

Figure 3 is an end view of the spring-pressed catch and the pivot block therefor which are shown in Figures 1 and 2;

Figure 4 is a partial plan view of a slightly modified form of saw in accordance with this invention, the saw being shown applied to a piece of work to enable a line to be squared across it, and Figure 5 is a fragmentary view of part of the structure shown in Figure 1, the bolt which secures the bevel arms in position being omitted.

According to the present invention I provide a hand saw comprising a saw blade, a handle secured to the blade at one end thereof, the leading edge of said handle extending rearwardly to provide a nose portion adjacent the back edge of the saw blade, a bevel blade carried by an arm, and means pivotally securing the arm to the nose portion of the handle whereby the bevel blade may be moved from and to a fully retracted position in which it extends rearwardly to and from an extended position.

A preferred form of saw according to my invention has two bevel blades, one on each side of the saw, which are movable together so that the two blades always form the same angle with the back edge of the saw, the arms which carry the blades each providing a hub portion that seats on the nose portion of the handle. These arms are integral with and extend substantially the full length of the blades whereby the blades are buttressed and rigidified and the handle is recessed to receive the arms snugly in the fully retracted position of the blades so that the blades and arms conform to the general contour of the handle. The leading edge of the handle extends rearwardly from the nose portion thereof so as to form an angle of 135° with the back edge of the saw blade whereby the bevel blades have an effective range of 135°.

Referring now to the drawing, the saw shown therein comprises a saw blade 1 secured at one end by suitable means (not shown) to a handle 2 which may advantageously be formed of moulded plastic material. The leading edge of the handle extends rearwardly to provide a rounded projecting or nose portion 3 adjacent the back edge 4 of the saw blade 1 and a rectilinear portion 5 which extends at an angle of 135° to the back edge 4. The square and bevel attachment indicated generally by the reference numeral 10 comprises two bevel blades 11, 12 which extend on opposite sides of the saw and which consist of rectangular strips of metal or other suitable material carried by and extending at right angles to arms 13, 14 respectively that extend the full length of the blades and project beyond one end of the blades to form circular hub portions to which the blades extend tangentially. The arms 13, 14 are pivotally secured to the nose portion 3 of the handle by means of a pivot pin 15 integral with and extending normally from the centre of the circular hub portion provided by arm 13, this pin extending through and being rotatable in a sleeve 16 housed within a hole through the nose portion 3 of the handle. The pin 15, at its free end, has a squared portion 17 which is received within a correspondingly shaped hole in the circular hub portion of arm 14. The sides of the handle 2 are recessed to receive snugly the arms 13, 14 so that, when fully retracted, the arms conform to the general contour of the handle and lie flush therewith, and these arms are secured to the handle by a bolt 18 screwed into the free end of pin 15. The arms 13, 14 being keyed together, rotate as one and the blades 11, 12 are thus maintained co-planar. In the fully retracted position of the arms 13, 14, shown in chain lines in Figure 1, the blades 11, 12 lie snugly against the plane portion of the leading edge of the handle.

In my improved saw the bevel blades are preferably spring-loaded so that such blades are urged to an extended position and in the saw shown in the drawing the blades 11, 12 are loaded by a spiral spring 19 housed within a shallow circular recess 20 in one face of the nose portion 3 of the handle. The ends of spring 19 are outturned, one end 21 being received in a hole in the base of the recess 20, the other end 22 being received in a hole in the hub portion of arm 14, the arrangement being such that, in the fully retracted position of the bevel attachment, the spring 19 is loaded and urges the bevel blades forwardly. Means are provided for releasably holding the bevel blades in any desired position and in the saw illustrated such means comprise a spring-loaded pivoted catch 23. The catch 23 is pivotally mounted by means of a pin 24, the ends of which extend into the limbs 25, 26 of a U-shaped pivot block 27 secured within a recess 28 in the handle 2 by means of bolt 35, the leading end of the catch being urged inwardly towards the saw blade 1 by a V-shaped spring 29, one arm of which seats on the base of recess 28, the other arm bearing against the catch 23 at the rear end thereof. The leading end of the catch 23 is bevelled as shown at 30 and is adapted to engage in any one of a plurality of correspondingly-shaped notches 31 in the periphery of the hub portion of arm 14. These notches 31 are angularly spaced 45° with respect to the axis of pin 15 and it will be understood that, when the bevel attachment is held in its fully retracted position by engagement of the leading end of the catch in the innermost notch 31, the attachment may be released by applying pressure to the rear end of the catch, thus raising the forward end of the catch from the notch and allowing the bevel blades to be moved forwardly under the action of spring 19 to a position in which the forward end of the catch may be engaged in any other desired notch, which will co-operate with such end of the catch to hold the bevel blades firmly in the desired position thereof. The periphery of hub portion of the arm 14 bears an arcuate scale 32, the graduations of which are spaced 5° one from the other. The forward end of catch 23 may advantageously bear an index 33 against which the scale 32 may be read and also a scale 34 graduated in degrees on either side of index 33 so that the bevel blades 11, 12 may be readily set with an accuracy of 1°. The bevel blades are held in any desired position in which the forward end of the catch extends intermediately of the notches 31 by the clamping action exerted on the hub portion of arm 14 by the plane portion of the forward end of the spring-loaded catch 23.

It will be seen that, with the bevel attachment 10 held in its fully retracted position by catch 23, such attachment conforms substantially to the general contour of the handle and substantially presents no projecting parts which would interfere with the normal use of the saw or which would be damaged or cause damage to a piece of work. The bevel attachment may be readily released by manual operation of catch 23 and also readily set to any desired angle by means of the scales conveniently provided by arm 14 and catch 23.

Figure 4 shows a slightly modified saw in which the bevel blades have been secured to extend at right angles to the back edge 4' and have been applied to an edge 8 of a piece of work 6 whereby a line may be readily and accurately squared across the work. In the modified saw shown in Figure 4, the saw blade 1' is provided with an aligned series of holes 7 spaced 1 inch or other desired unit of linear measure one from the other. The holes extend parallel and adjacent to the back edge 4' of the saw blade. With the point of a scribe inserted in one of the holes 7, a line may readily be drawn parallel to the edge 8 of the work 6 and at a distance from such edge which is one or more of such units, by moving the saw along the work whilst maintaining the bevel blades firmly against the edge 8. The nose portion of the handle may be recessed to receive a slide that co-operates with a slot in the saw blade 1' parallel and adjacent to the back edge and extending forwardly from the rear end thereof so that the slide may be moved and set to a position extending forwardly of the bevel blades 11, 12 by any desired distance which is less than the unit of measure by which the holes 7 are spaced. Thus, by bringing the forward end of the slide to bear against the edge 8 of the work 6 a line may be drawn on the work which is parallel to edge 8 and spaced therefrom any desired distance. The edge of the slot in the saw blade adjacent the back edge thereof may have a series of teeth thereon, say eight to one inch, the slide being movable along the strip of the saw blade formed by the slot therein so that the slide is releasably secured by the appropriate tooth. The slide may conveniently be formed by bending and forming a strip of sheet metal to provide a U-shaped body portion and a work-contacting head portion that extends from the free end of one limb of the body portion and that has a slot through which the said strip of the saw blade may extend.

The arm 14 may have, in addition or alternatively to the notches 31, slightly raised portions adapted to engage the side of the forward end of catch 23 when the arm advances under the action of spring 19 to form stops for the arm at say the positions thereof in which the bevel blades extend at 90° and 45° to the back edge of the saw blade, these stops being of such height that the forward end of the catch may ride over the stop in the fully depressed position of the catch.

I claim:
1. A device for marking off angles on a piece of work comprising a blade member, having a straight edge, a handle secured to the blade member at one end thereof, the leading edge of said handle extending rearwardly to provide a nose portion adjacent said straight edge of said blade member, an arm on each side of the said blade member, each arm having a circular hub portion that is seated on the nose portion of the handle, a bevel blade carried by each arm, means pivotally securing the arms to the nose portion of the handle whereby the bevel blades move together, a spring housed in the nose portion of the handle and urging the arms to a position in which they extend away from the handle, and a spring-loaded pivoted catch that is mounted on said handle and that co-operates with the periphery of the hub portion of one of said arms to hold the arms in any desired angular position thereof, said last-mentioned hub portion having a plurality of peripheral notches into any one of which part of the pivotal catch may be received.

2. A device for marking off angles on a piece of work comprising a blade member, having a straight edge, a handle secured to the blade member at one end thereof, the leading edge of said handle extending rearwardly to provide a nose portion adjacent said straight edge of said blade member, an arm on each side of the said blade member, each arm having a hub portion that is seated on the nose portion of the handle, a bevel blade carried by each arm, means pivotally securing said hub portions to the nose portion of the handle whereby the bevel blades move together, a spring acting between the handle and the arms to urge the latter to a position in which they extend away from the handle, and a detent mounted on said handle and releasably engaging the hub portion of one of said arms to retain the arms in any desired angular position.

GEORGE RICHARD RATCLIFF.

REFERENCES CITED

The following references are of record in the file of this patent:

UNITED STATES PATENTS

| Number | Name | Date |
|---|---|---|
| 234,378 | Pierce | Nov. 9, 1880 |
| 1,135,912 | Nugent | Apr. 13, 1915 |
| 1,277,433 | Larson | Sept. 3, 1918 |
| 1,285,513 | Wheeler | Nov. 19, 1918 |
| 1,411,017 | Guerriero | Mar. 28, 1922 |
| 1,425,536 | Neron | Aug. 15, 1922 |
| 1,563,495 | Jones | Dec. 1, 1925 |
| 1,605,013 | Thomas | Nov. 2, 1926 |
| 2,500,248 | Grahn | Mar. 14, 1950 |